US012779433B2

(12) United States Patent
Lai et al.

(10) Patent No.: US 12,779,433 B2
(45) Date of Patent: Nov. 3, 2026

(54) SUPERABSORBENT POLYMER AND METHOD FOR PRODUCING THE SAME

(71) Applicant: FORMOSA PLASTICS CORPORATION, Kaohsiung City (TW)

(72) Inventors: Tai-Hong Lai, Kaohsiung City (TW); Zhong-Yi Chen, Kaohsiung City (TW); Cheng-Lin Lee, Kaohsiung City (TW); Feng-Yi Chen, Kaohsiung City (TW)

(73) Assignee: FORMOSA PLASTICS CORPORATION, Kaohsiung City (TW)

( * ) Notice: Subject to any disclaimer, the term of this patent is extended or adjusted under 35 U.S.C. 154(b) by 598 days.

(21) Appl. No.: 18/361,135

(22) Filed: Jul. 28, 2023

(65) Prior Publication Data

US 2024/0042416 A1 Feb. 8, 2024

(30) Foreign Application Priority Data

Aug. 4, 2022 (TW) ................................. 111129327

(51) Int. Cl.

| | |
|---|---|
| ***B01J 20/26*** | (2006.01) |
| ***B01J 20/28*** | (2006.01) |
| ***B01J 20/32*** | (2006.01) |
| ***D04H 1/72*** | (2012.01) |
| ***D04H 1/728*** | (2012.01) |

(52) U.S. Cl.

CPC ....... *B01J 20/267* (2013.01); *B01J 20/28038* (2013.01); *B01J 20/3282* (2013.01); *D04H 1/728* (2013.01); *B01J 2220/68* (2013.01)

(58) Field of Classification Search

None

See application file for complete search history.

(56) References Cited

U.S. PATENT DOCUMENTS

| | | | |
|---|---|---|---|
| 5,368,918 | A | 11/1994 | Harada et al. |
| 5,985,944 | A | 11/1999 | Ishizaki et al. |
| 6,346,569 | B1 | 2/2002 | Irizato et al. |
| 6,849,665 | B2 | 2/2005 | Frenz et al. |
| 7,777,093 | B2 | 8/2010 | Smith et al. |
| 8,822,582 | B2 | 9/2014 | Smith et al. |
| 10,335,768 | B2 | 7/2019 | Ahn et al. |
| 2002/0150761 | A1 | 10/2002 | Lange et al. |
| 2005/0245684 | A1 | 11/2005 | Daniel et al. |
| 2017/0050170 | A1 | 2/2017 | Braun et al. |

FOREIGN PATENT DOCUMENTS

| | | | |
|---|---|---|---|
| CN | 1747751 | A | 3/2006 |
| CN | 103619291 | A | 3/2014 |
| CN | 104292806 | A | 1/2015 |
| CN | 111944085 | A | 11/2020 |
| EP | 0478150 | A2 | 4/1992 |

(Continued)

*Primary Examiner* — Daniel Berns

(74) *Attorney, Agent, or Firm* — MUNCY, GEISSLER, OLDS & LOWE, P.C.

(57) ABSTRACT

The present application relates to a superabsorbent polymer and a method for producing the same. The superabsorbent polymer comprises a core structure, a shell layer covering the core structure and a fiber-modified layer covering an outer surface of the shell layer. With the fiber-modified layer, the superabsorbent polymer not only has good water absorption properties, but also has excellent liquid permeability and permeability.

14 Claims, 4 Drawing Sheets

(56) References Cited

FOREIGN PATENT DOCUMENTS

| | | | |
|---|---|---|---|
| JP | S56131608 | A | 10/1981 |
| JP | S5744627 | A | 3/1982 |
| JP | S5842602 | A | 3/1983 |
| JP | S58117222 | A | 7/1983 |
| JP | S60163956 | A | 8/1985 |
| JP | S60255814 | A | 12/1985 |
| JP | H1113406 | A | 5/1989 |
| JP | H1292004 | A | 11/1989 |
| JP | H2153903 | A | 6/1990 |
| JP | 2509087 | B2 | 6/1996 |
| JP | 2001523289 | A | 11/2001 |
| JP | 2006063219 | A | 3/2006 |
| JP | 2009270038 | A | 11/2009 |
| JP | 2013540460 | A | 11/2013 |
| JP | 6532894 | B2 | 6/2019 |
| TW | 202006025 | A | 2/2020 |
| WO | WO-2004113452 | A1 | 12/2004 |
| WO | WO-2006082189 | A1 | 8/2006 |
| WO | WO2020003935 | A1 | 1/2020 |

SUPERABSORBENT POLYMER AND METHOD FOR PRODUCING THE SAME

RELATED APPLICATIONS

This application claims priority to Taiwan Application Serial Number 111129327, filed on Aug. 4, 2022, which is incorporated herein by reference.

BACKGROUND

Field of Invention

The present application relates to a superabsorbent polymer. More particularly, the present application provides a superabsorbent polymer with well water absorption properties, liquid permeability and permeability and a method for producing the same.

Description of Related Art

Superabsorbent polymer is widely used as water-retaining agents in agricultural or horticultural aspects, anti-dew condensation agents in building materials, and materials for removing moisture from petroleum, water-proof coating agents on an outer layer of cables and hygiene supplies. For example, diapers, women's hygiene products and disposable wipes etc., and especially mostly used in the diapers.

In recent years, the diapers are developed to be much thinner. Therefore, it tends to reduce an amount of hydrophilic fibers (i.e. wood pulp or materials with low bulk density) and increase an amount of the superabsorbent polymer (i.e. materials with high bulk density and water absorption amount). With the increasing of the ratio of the superabsorbent polymer in the absorbent structure of the diapers, it achieves to thin the diapers. However, based on the actual applied situations of the diapers, the superabsorbent polymer which has absorbed a large amount of water has softer mechanical strength of gel after absorbing water when the amount of the superabsorbent polymer is increased and the amount of hydrophilic fibers is decreased, and therefore it results in defects of gel blocking, further significantly lowering liquid diffusion in the diapers. Accordingly, properties of the diapers are affected.

The well known method for preventing the gel blocking can be: performing a polymerization reaction with UV light, and performing a surface crosslinking reaction twice to prevent the gel blocking (U.S. Pat. No. 10,335,768B2); mixing polyvalent metal salt (e.g. sulfuric acid aluminum) with the superabsorbent polymer to efficiently lower the gel blocking, thereby enhancing permeability of the superabsorbent polymer after absorbing liquid (JP 2001-523289A); adding polyvalent metal salt solution to the surface of the superabsorbent polymer with a particle size of 5 μm to 500 μm, then heating the superabsorbent polymer to improve the gel blocking (JP 2509087B2); mixing water-soluble polyvalent metal powders, adhesive and the superabsorbent polymer to improve diffusivity and liquid permeability of the superabsorbent polymer after absorbing liquid (CN 1747751A, WO 2004/113452A1 or US 20170050170A1); applying azo compounds containing amine groups as a foaming agent in the aqueous solution of acid groups-containing monomers, and the obtained superabsorbent polymer has excellent liquid permeability (U.S. Pat. No. 5,985,944); adding surfactants (e.g. polyoxyethylene sorbitan fatty acid ester) into the aqueous solution of acid groups-containing monomers to decrease a solubility of gas dissolve in the monomer aqueous solution (JP 6532894B2); or adding nitrogen-containing polymers (such as N-vinylcarboxamide) or solutions containing then into the superabsorbent polymer to enhance liquid permeability of the superabsorbent polymer, and nitrogen atoms in the nitrogen-containing polymers can be protonated (US 20050245684A1).

Besides, U.S. Pat. No. 7,777,093B2 discloses that coating thermoplastic polymers (such as polyurethane, polyester, or the like) on the surface of the superabsorbent polymer can enhance liquid permeability of the superabsorbent polymer. However, the additional adding of raw materials of the superabsorbent polymer not only raises concerns about the safety of the raw materials but also increases the overall cost, further lowering other physical properties.

In addition, performing the surface treatment step with polyamine polymers such as a combination of polyvinylamine or polyallylamine can also improve the liquid permeability of the superabsorbent polymer (WO 2006082189A1). However, the difficulty and the cost of producing particles coated with polyamine, and chemical properties and physical properties thereof all affect water absorption properties of the superabsorbent polymer. Therefore, it is difficult to design an ideal superabsorbent polymer.

Accordingly, there is an urgent need to provide a superabsorbent polymer and a method for producing the same to further improve the gel blocking defects of the conventional superabsorbent polymer.

SUMMARY

Therefore, an aspect of the present application is to provide a superabsorbent polymer. A fiber-modified layer is disposed on a surface of a shell layer of the superabsorbent polymer, thereby efficiently improving the conventional gel blocking defects.

Another aspect of the present application is to provide a method for producing a superabsorbent polymer. A fiber-modified layer of the superabsorbent polymer is formed by a spinning step to enhance liquid fluidity between the polymer particles, and thus liquid permeability and permeability of the superabsorbent polymer are improved.

Another aspect of the present application is to provide a method for producing a superabsorbent polymer. A fiber-modified layer is formed by an electrospinning process on a shell layer of the superabsorbent polymer to enhance liquid permeability and permeability of the superabsorbent polymer.

According to an aspect of the present application, a superabsorbent polymer is provided. The superabsorbent polymer comprises a core structure, a shell layer and a fiber-modified layer. The shell layer completely encloses the core structure, and the fiber-modified layer covers at least one portion of an outer surface of the shell layer. The fiber-modified layer includes a plurality of fibers, and the fibers are anisotropically stacked on the outer surface.

According to some embodiments of the present application, the aforementioned fiber-modified layer continuously covers on a portion of the outer surface of the shell layer.

According to some embodiments of the present application, the aforementioned fiber-modified layer discontinuously covers on a plurality of portions of the outer surface of the shell layer.

According to some embodiments of the present application, the aforementioned fiber-modified layer completely covers the outer surface of the shell layer.

According to some embodiments of the present application, the aforementioned fibers have a uniform diameter.

According to some embodiments of the present application, the aforementioned fibers have the uniform diameter not more than 1000 nm.

According to another aspect of the present application, a method for producing a superabsorbent polymer is provided. In the method for producing the superabsorbent polymer, a free radical polymerization reaction is firstly performed to a superabsorbent polymer composition to form a crosslinked core structure. The superabsorbent polymer composition comprises an aqueous solution of acid groups-containing monomers, a crosslinking agent, and a polymerization initiator. The polymerization initiator includes a thermal decomposition initiator and/or a redox initiator. Next, a surface crosslinking reaction is performed to the crosslinked core structure to form a shell layer on the crosslinked core structure. The shell layer completely covers the crosslinked core structure. After the surface crosslinking reaction is performed, a spinning process is performed to form a fiber-modified layer on an outer surface of the shell layer, thereby obtaining the superabsorbent polymer. The fiber-modified layer covers at least one portion of the outer surface, and the fiber-modified layer includes a plurality of fibers.

According to some embodiments of the present application, the aforementioned aqueous solution of acid groups-containing monomers has a neutralization concentration of 45 molar percent to 85 molar percent.

According to some embodiments of the present application, the aforementioned crosslinked core structure is cut to form a hydrogel with a particle size of 0.05 mm to 2.00 mm before performing the surface crosslinking reaction.

According to some embodiments of the present application, the aforementioned spinning process includes preparing a polymer solution, and performing a spinning step. The polymer solution includes a polymer material, and the spinning step is performed to the polymer solution to form the fibers.

According to some embodiments of the present application, the aforementioned spinning step is performed in a closed environment.

According to some embodiments of the present application, a molecular weight of the aforementioned polymer material is 10,000 g/mole to 500,000 g/mole.

According to some embodiments of the present application, a hydrophilic-lipophilic balance (HLB) value of the aforementioned polymer material is 11 to 19.

According to some embodiments of the present application, the aforementioned spinning step is performed by electrospinning.

According to some embodiments of the present application, the aforementioned spinning step includes applying a high-voltage electric field to the polymer solution.

According to some embodiments of the present application, the aforementioned high-voltage electric field is 1000 volts to 30,000 volts.

According to some embodiments of the present application, a diameter of the aforementioned fibers is not more than 1000 nm.

According to another aspect of the present application, a method for producing a superabsorbent polymer is provided. In the method for producing the superabsorbent polymer, a free radical polymerization reaction is firstly performed to a superabsorbent polymer composition to form a crosslinked core structure. The superabsorbent polymer composition comprises an aqueous solution of acid groups-containing monomers with a neutralization concentration of 45 molar percent to 85 molar percent, a crosslinking agent, and a polymerization initiator. The polymerization initiator includes a thermal decomposition initiator and/or a redox initiator. Next, a surface crosslinking reaction is performed to the crosslinked core structure to form a shell layer on the crosslinked core structure. The shell layer completely covers the crosslinked core structure. After the surface crosslinking reaction is performed, an electrospinning process is performed with a polymer solution to form a fiber-modified layer on an outer surface of the shell layer, thereby obtaining the superabsorbent polymer. The electrospinning process is performed in a closed environment. The fiber-modified layer covers at least one portion of the outer surface, and the fiber-modified layer includes a plurality of fibers.

According to some embodiments of the present application, the aforementioned fiber-modified layer completely covers on the outer surface of the shell layer.

According to some embodiments of the present application, the aforementioned fiber-modified layer discontinuously covers on a plurality of portions of the outer surface of the shell layer.

In the superabsorbent polymer and the method for producing the same of the present application, the shell layer of the core-shell structure of the superabsorbent polymer and the fiber-modified layer disposed on the surface of the shell layer are formed by the surface crosslinking reaction and the spinning process, and therefore the obtained superabsorbent polymer not only has excellent water absorption properties but also well liquid permeability and permeability. The spinning process is performed to produce the nanofibers with the electrospinning technology to efficiently increase a gap between the particles, further enhancing liquid fluidity between the particles. Accordingly, the liquid permeability and permeability can be enhanced. The nanofibers has uniform diameter based on the electrospinning technology, such that the nanofibers can efficiently adjust pore structures in the fiber-modified layer to solve the conventional defects of gel blocking, further meeting the requirements of the superabsorbent polymer.

BRIEF DESCRIPTION OF THE DRAWINGS

The application can be more fully understood by reading the following detailed description of the embodiment, with reference made to the accompanying drawings as follows.

DETAILED DESCRIPTION

Figure 1:
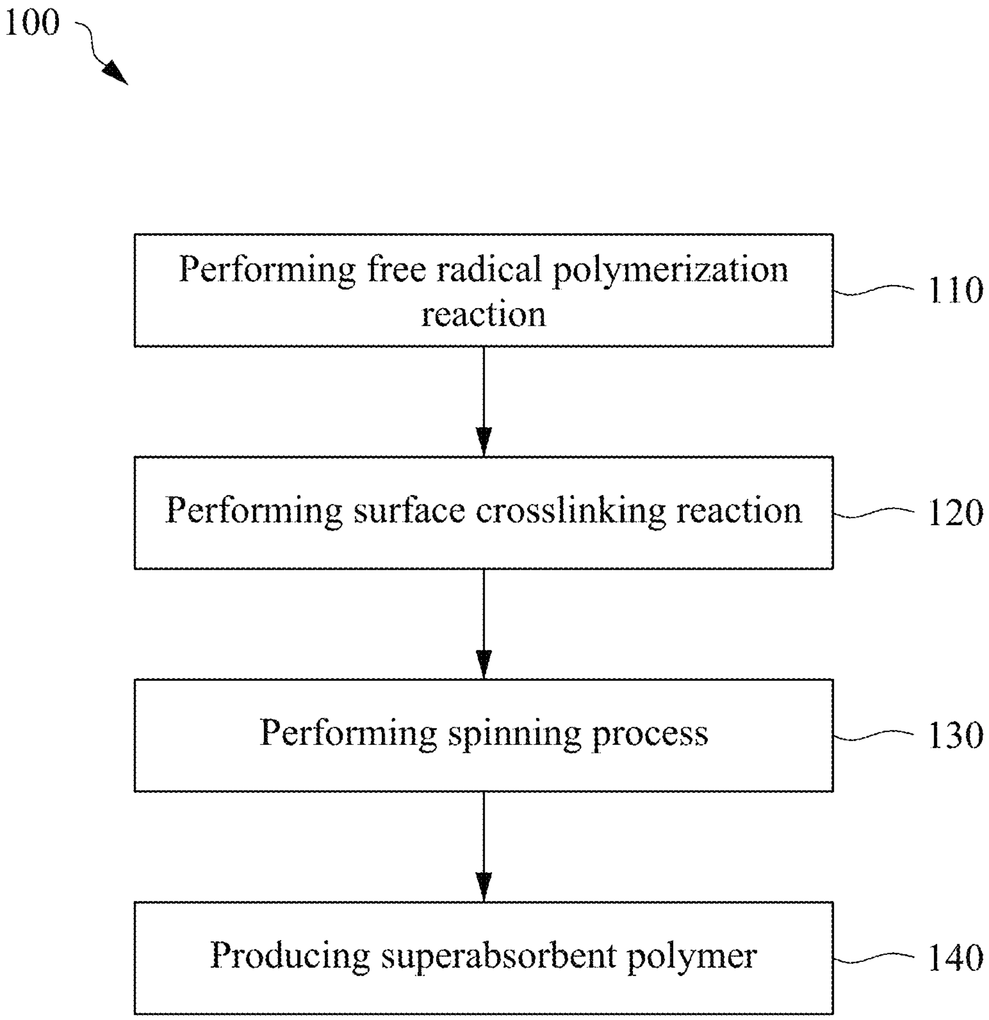
FIG. 1 illustrates a flow chart of a method for manufacturing a superabsorbent polymer according to some embodiments of the present application.

Reference will now be made in detail to the present embodiments of the application, examples of which are illustrated in the accompanying drawings. Wherever possible, the same reference numbers are used in the drawings and the description to refer to the same or like parts.

The present application discloses a method for producing a superabsorbent polymer. An electrospinning technology is applied in the method to produce nanofibers, and the nanofibers are covered on a surface of the superabsorbent polymer, thereby simultaneously enhancing liquid permeability and permeability of the superabsorbent polymer with a prerequisite of maintaining water absorption properties. When the superabsorbent polymer of the present application is applied in absorbent products such as diapers, the conventional gel blocking defects can be effectively avoided, and therefore the water absorption properties of the absorbent products can be maintained. In the present application, a superabsorbent polymer composition is firstly subjected to a free radical polymerization to form a hydrogel, and the hydrogel is further sheared into a small hydrogel; then, the small hydrogel is dried at 100° C. to 250° C. with hot air, and then being crushed and screened to obtain a crosslinked core structure; next, the crosslinked core structure is subjected to a surface crosslinking reaction, and being covered with the aforementioned nanofibers to obtain the superabsorbent polymer of the present application.

In the superabsorbent polymer of the present application, nanofibers with pore structures which are controllable can be formed on the surface of the superabsorbent polymer by electrospinning, such that a fiber-modified layer is disposed on the surface of the superabsorbent polymer, further increasing the space between the polymer particles. Therefore, fluidity of the liquid can be effectively improved to solve the conventional gel blocking defects, and the superabsorbent polymer can still have good water absorption properties.

Referring to FIG. 1, it illustrates a flow chart of a method for manufacturing a superabsorbent polymer according to some embodiments of the present application. In the method 100, a free radical polymerization is performed to a superabsorbent polymer composition to form a crosslinked core structure, shown as operation 110. The superabsorbent polymer composition includes an aqueous solution of acid groups-containing monomers, a crosslinking agent and a polymerization initiator.

The aqueous solution of acid groups-containing monomers is formed from dissolving the acid group-containing monomer compound into water. The acid group-containing monomer compound can include but be not limited to acrylic acid, methacrylic acid, 2-propenylamine-2-methylpropanesulfonic acid and/or the like. In some embodiments, the acid group-containing monomer compound can selectively include other water soluble monomers having acid groups and unsaturated double bonds. For example, other water soluble monomers having acid groups and unsaturated double bonds can include maleic acid, fumaric acid, maleic anhydride, fumaric anhydride, and/or other suitable water soluble monomers having acid groups and unsaturated double bonds. In other embodiments, the acid group-containing monomer compound can selectively include other hydrophilic monomers containing unsaturated double bonds. For example, other hydrophilic monomers containing unsaturated double bonds can include acrylamide, methacrylamide, 2-carboxyethyl acrylate, 2-carboxyethyl methacrylate, methyl acrylate, ethyl acrylate, dimethylaminoacrylamide, trimethylammonium chloride, and/or other suitable hydrophilic monomers containing unsaturated double bonds. There are no specific limitations to an amount of the hydrophilic monomer as long as physical properties of the superabsorbent polymer are not affected. The aforementioned monomers are not limited to only one, and they can be applied with a combination of multi monomers.

In some embodiments, carboxylic acid groups of the acid group-containing monomer compound can be partially neutralized to control pH value of the obtained superabsorbent polymer, and therefore it would be neutral or slightly acidic. The neutralizing agent used for neutralization may be a hydroxide or a carbonate compound of an alkali metal group element or an alkaline earth group element. For example, the neutralizing agent can include but be not limited to sodium hydroxide, potassium hydroxide, sodium carbonate, potassium carbonate, sodium bicarbonate, potassium bicarbonate or ammonia compounds, and the neutralizing agent can be used alone or a combination two or more. The carboxylic acid groups of the acid group-containing monomer compounds are partially neutralized to form sodium salts, potassium salts or ammonium salts. In some embodiments, a neutralization concentration of the aqueous solution of acid groups-containing monomers can be 45 molar percent to 85 molar percent, and preferably be 50 molar percent to 75 molar percent. When the neutralization concentration of the aqueous solution of acid groups-containing monomers is within the aforementioned range, the superabsorbent polymer can be neutral or slightly acidic to prevent the human body from damage when it contacts with the skin. In some embodiments, pH value of the aqueous solution of acid groups-containing monomers is not less than 5.5. When pH value of the aqueous solution of acid groups-containing monomers is not less than 5.5, the crosslinked core structure has less residual monomers, therefore facilitating to improve physical properties of the superabsorbent polymer.

During free radical polymerization, there are no specific limitations to the concentration of the aqueous solution of acid groups-containing monomers, but it is preferably controlled at 20 wt % to 55 wt %, and more preferably being controlled at 30 wt % to 45 wt %. When the concentration of the aqueous solution of acid groups-containing monomers is within the range, the hydrogel formed by polymerization can have suitable hardness and viscosity, thereby having better processing properties, and the residual monomer in the hydrogel is less, therefore subjecting the obtained superabsorbent polymer to have better physical properties.

In some embodiments, the aqueous solution of acid group-containing monomers can selectively include water-soluble polymers. In some examples, the water-soluble polymer can include but be not limited to partially saponified or fully saponified polyvinyl alcohol, polyethylene glycol, polyacrylic acid, polyacrylamide, starch and/or starch derivatives (such as methyl cellulose, methyl cellulose acrylate and/or ethyl cellulose). Preferably, the water-soluble polymer can be starch, and/or partially or fully saponified polyvinyl alcohol. Based on an amount of the aqueous solution of acid group-containing monomers as 100 wt %, an amount of the water-soluble polymer is 0 wt % to 20 wt %, preferably is 0 wt % to 10 wt %, and more preferably is 0 wt % to 5 wt %. When the amount of the water-soluble polymer is within this range, the production cost of the superabsorbent polymer can be reduced, but its water-absorbing properties will not be affected, such that it can meet the requirements of the application.

The crosslinking agent can include a compound having at least two unsaturated double bond groups, a compound having at least two epoxy groups, other suitable crosslinking agents, or a combination thereof. When the free radical reaction is performed, the crosslinking agent subjects the obtained crosslinked core structure to have a suitable crosslinking degree, thereby improving processability of the obtained superabsorbent polymer. In some examples, the compound having at least two unsaturated double bond groups can include but be not limited to N,N'-bis(2-propenyl)amine, N,N'-methylenebisacrylamide, N,N'-methylene dimethacrylamide, propylene acrylate, ethylene glycol diacrylate, polyethylene glycol diacrylate, ethylene glycol dimethacrylate, polyethylene glycol dimethyl acrylates, glycerin triacrylate, glycerin trimethacrylate, glycerol added ethylene oxide triacrylate, glycerol added ethylene oxide trimethacrylate, trimethylolpropane added ethylene oxide triacrylate ester, trimethylolpropane added ethylene oxide trimethacrylate, trimethylolpropane trimethacrylate, trimethylolpropane triacrylate, N,N,N-tris(2-propenyl)amine, diacrylic acid ethylene glycol esters, polyoxyethylene glyceryl triacrylate, diethylpolyoxyethylene glyceryl triacrylate and/or dipropylene triethylene glycol ester. In some examples, the compound having at least two unsaturated epoxy groups can include but be not limited to sorbitol polyglycidyl ether, polyglycerol polyglycidyl ether, ethylene glycol diglycidyl ether, diethylene glycol diglycidyl ether, polyethylene glycol diglycidyl ether and/or diglycerol polyglycidyl ether. Based on a total amount of solid content in the superabsorbent polymer composition as 100 wt %, an amount of the crosslinking agent is 0.001 wt % to 5 wt %, and preferably is 0.01 wt % to 3 wt %. When the amount of the crosslinking agent is within the range, the crosslinked core structure formed by the free radical polymerization can have better mechanical properties, thereby facilitating to be applied in mechanical processing, and further the obtained superabsorbent polymer can still have better water absorption properties.

The polymerization initiator can be decomposed to generate free radicals, thereby inducing the free radical polymerization reaction to be performed to the acid group-containing monomer compound to form a hydrogel, therefore obtaining a crosslinked core structure. The polymerization initiators of the present application can include but be not limited to thermal decomposition initiators, redox initiators, other suitable polymerization initiators, or a combination thereof. In some examples, the thermal decomposition initiator can include hydrogen peroxide, di-tertiary butyl peroxide, amide peroxide, persulfate (such as ammonium salt, alkali metal salt or the like) and/or azo compound (such as 2,2'-azobis(2-amidinopropane) dihydrochloride, 2,2'-azobis (N,N-dimethyleneisobutyramide) dihydrochloride salt or the like). In some embodiments, the redox initiator can include acidic sulfite, thiosulfate and/or ascorbic acid or ferrous salt.

When the polymerization initiator includes both of the thermal decomposition initiator and the redox initiator, the redox initiator can firstly be decomposed to generate the free radicals, thereby inducing a first-stage polymerization reaction in the free radical polymerization reaction. At the same time, the heat of reaction generated in the first-stage of the polymerization reaction can subject the thermal decomposition initiator to be decomposed to induce a second-stage of the polymerization reaction, further enhancing the reactivity of the free radical polymerization.

Based on a weight of the neutralized acrylate salt as 100 wt %, an amount of the polymerization initiator is 0.001 wt % to 10 wt %, and preferably is 0.1 wt % to 5 wt %. When the amount of the polymerization initiator is 0.001 wt % to 10 wt %, the free radical polymerization reaction has suitable reactivity, thereby being easier to be controlled, and further it can prevent the obtained hydrogel from excessive degree of polymerization to avoid forming gel lumps.

The free radical polymerization reaction of the present application can be performed in a conventional batch reaction vessel or on a conveyor belt reactor. After the free radical polymerization is performed, the obtained hydrogel is firstly cut into small hydrogels with a diameter of 2.0 mm or less with a crusher, then being dried, and further being screened. Preferably, the diameter of the small hydrogels is 1.0 mm or less.

When the hydrogel is cut, a particle size of the small hydrogels is preferably 2.00 mm or less, and more preferably is 0.05 mm to 1.50 mm. The small hydrogels with the particle size greater than 2.00 mm is sent back to the reactor for re-chopping. When the small hydrogels with a particle size greater than 2.00 mm is subjected to the subsequent drying, it is easy to result from excessive residual monomers in the final product due to poor heat conduction efficiency, and further the final product has poor physical properties. When the small hydrogels with a particle size less than 0.05 mm is subjected to the drying, an amount of fine powders in the final product is easy to be increased after being crushed, further lowering quality of the final product. According to the present application, the narrower of the particle size distribution of the acrylate gel can not only subject the physical properties of the gel to be the best state after drying, but also facilitate to control the time and temperature of the subsequent drying.

The drying temperature can be 100° C. to 180° C. If the drying temperature is lower than 100° C., the drying time would be too long to be equipped with economically beneficial. If the drying temperature is higher than 180° C., the excessive high temperature would easily subject the crosslinking agent to induce the crosslinking reaction early, and thereby residual monomer are not be efficiently removed due to excessive degree of polymerization during the sequential drying.

After the drying, the screening is performed. The fixed particle size for the screening is preferably 0.06 mm to 1.00 mm, more preferably 0.10 mm to 0.850 mm. The fine powder with a particle size of less than 0.06 mm tends to increase the amount of dust in the final product. The particles with a particle size larger than 1.00 mm tend to reduce the water absorption rate of the final product. According to the application, the particle size distribution of the acrylate polymer is as narrow as possible.

After the drying, and the crushing and the screening with the fix particle size are performed, the crosslinked core structure of the present application can be obtained.

Continuously referring to FIG. 1. After the operation 110 is performed, a surface crosslinking reaction is performed to the crosslinked core structure, shown as operation 120. The obtained crosslinked core structure is an insoluble hydrophilic polymer, and an interior of the crosslinked core structure has uniform bridging structure. Generally, the surface of the crosslinked core structure is further bridged for improving the quality (such as, absorption rate, colloid strength, anti-caking, liquid permeability and/or the like) of the subsequently obtained superabsorbent polymer. The surface crosslinking treatment is performed with a crosslinking agent with multi-function groups that can be react with acid groups. The surface crosslinking agent has been proposed by many patents, such as: dispersing the superabsorbent polymer and the crosslinking agent in an organic solvent for surface cross-linking treatment (JP 56-131608A, JP 57-44627A, JP 58-42602A, JP 58-117222A); directly blending the crosslinking agent and crosslinking agent solution with inorganic powders into the superabsorbent polymer (JP 60-163956A, JP 60-255814A); treating with steam after adding the crosslinking agent (JP 1-113406A); performing the surface treatment with organic solvents, water and polyols (JP 1-292004A, U.S. Pat. No. 6,346,569B1); performing the surface treatment with organic solvents, water, ether compounds (JP 2-153903A) or the like. Although these surface treatment methods can increase the absorption rate and the absorption against pressure, they will cause excessive reduction in centrifuge retention capacity and reduce the performance of practical applications.

The surface crosslinking agent that can simultaneously be subjected to the reaction during the surface treatment can include but be not limited to polyols, polyamines, compounds having at least two epoxy groups, alkylene carbonate, and/or other suitable compounds. For example, the polyols can include glycerol, ethylene glycol, diethylene glycol, triethylene glycol, polyethylene glycol, and/or propylene glycol; polyamines can include ethylenediamine, diethylenediamine, and/or triethylenediamine; the compounds having at least two epoxy groups may include sorbitol polyglycidyl ether, polyglycerol polyglycidyl ether, ethylene glycol diglycidyl ether, diethylene glycol diglycidyl ether, polyethylene diol diglycidyl ether and/or diglycerol polyglycidyl ether; the alkylene carbonate may include ethylene glycol carbonate, 4-methyl-1,3-dioxolan-2-one, 4,5-Dimethyl-1,3-dioxolan-2-one, 4,4-Dimethyl-1,3-dioxolan-2-one, 4-ethyl-1,3-dioxolan-2-one, 1,3-dioxan-2-one, 4,6-dimethyl-1,3-dioxane-2-keto and/or 1,3-dioxepan-2-one. The aforementioned surface crosslinking agent can be used alone or a combination two or more. Based on the total solid content in the superabsorbent polymer composition as 100 wt %, the amount of the surface crosslinking agent is 0.001 wt % to 10 wt %, and preferably is 0.005 wt % to 5 wt %. When the amount of the surface crosslinking agent is within this range, the aforementioned surface crosslinking effect can be significantly enhanced, and the superabsorbent polymer can still have good water absorption properties and good physical properties.

When the surface crosslinking agent is coated, it can be directly added, added as a surface crosslinking agent aqueous solution, or added as a surface crosslinking agent hydrophilic organic solvent aqueous solution depending on types of the surface crosslinking agent. There are no specific limitations to the hydrophilic organic solvent as long as it can form a solution. In some examples, the hydrophilic organic solvent can be methanol, ethanol, propanol, isobutanol, acetone, methyl ether, ethyl ether and/or the like. Preferably, the hydrophilic organic solvent can be methanol and/or ethanol (U.S. Pat. No. 6,849,665B2).

After the surface crosslinking reaction is performed, the surface crosslinking agent can form a shell layer on an outer surface of the crosslinked core structure and completely cover the crosslinked core structure. Then, a spinning process is performed to form a fiber-modified layer on an outer surface of the shell layer to obtain the superabsorbent polymer of the present application, shown as operation 130 and operation 140 of FIG. 1.

During the spinning process, the fiber-modified layer with nanofibers can be formed by techniques such as stretching method, template synthesis method, self-assembly method and electrospinning method. The electrospinning method can use a wide range of raw materials, and its equipment is more convenient to operate. The method of electrospinning is to apply a high-voltage electric field to a polymer solution, such that the polymer solution is sprayed out from a spinning needle tip, and after the solvent is evaporated, the polymer in the solution is settled and solidified to obtain fiber materials with nanometer dimensions.

The nanofibers can be efficiently produced by electrospinning. The principle is that when the non-Newtonian fluid passes through the high-voltage electric field, it can form a Taylor cone structure at the exit of the spinning nozzle, and the sprayed solution droplets can form micron-scale to nano-scale fibers. The nanofibers can be collected on a tray, and the appearance is similar to irregular non-woven fabric. The injection flow rate is generally 0.001 ml/min to 0.1 ml/min.

In general, the electrospinning is performed in an open environment. However, the nanofibers formed by the electrospinning are affected by various environmental factors (such as ambient temperature, humidity, wind speed and/or the like) in the open environment, thereby affecting the appearance of the nanofibers, and further it may cause the obtained nanofibers to have defects of non-uniform diameter (e.g. produce the fibers having a large amount of beading).

The electrospinning of the present application is performed in a closed environment to effectively control the environmental factors for effectively solving the influence of the open environment. In the electrospinning device of the present application, the spinning needle tip and the collecting plate are disposed in a closed box, such that the nanofibers can be formed in a closed environment.

In the spinning process of the present application, a polymer solution is firstly prepared, and then a spinning step is performed to the polymer solution to form a fiber-modified layer with nanofibers on the outer surface of the shell layer. Each of the nanofibers has a uniform diameter. In some examples, the diameter of the nanofibers is not greater than 1000 nm.

The polymer solution is formed by dissolving a polymer material in a solvent. In order to effectively produce the nanofibers of the present application, weight average molecular weight ($M_w$) of the polymer material can be 10,000 g/mole to 500,000 g/mole, and preferably is 50,000 g/mole to 500,000 g/mole. When the weight average molecular weight of the polymer material is within the range, the polymer solution has suitable viscosity and mechanical properties, thereby facilitating to continuously and stably produce the nanofibers, and the obtained nanofibers are not easily interrupted. Therefore, the formation of the beading defects can be avoided. In some embodiments, a hydrophilic-lipophilic balance value of the polymer material is 11 to 19. When the hydrophilic-lipophilic balance value of the polymer material is within the range, the fiber-modified layer formed by the sequential electrospinning can effectively improve the liquid permeability and permeability of the superabsorbent polymer to meet the application requirements. Preferably, the hydrophilic-lipophilic balance value of the polymer material can be 13 to 18.

In some examples, the polymer material can include but be not limited to polyvinylidene fluoride (PVDF), polyvinylidene fluoride-hexafluoropropylene copolymer, polyacrylonitrile, polystyrene, polyglycolic acid, polyvinylpyrrolidone, polyethylene oxide, polyoxyethylene, polyvinyl alcohol, polybutylene terephthalate, polyethylene terephthalate, polyvinyl acetate, polycaprolactone, polyethylene glycol, polycarbonate, polyvinyl chloride, cellulose acetate, nanocellulose, methylcellulose, polylactic acid, polypeptide, polyurethane, other suitable polymer materials or a combination thereof.

There are no specific limitations to the solvent of the polymer solution as long as it can dissolve the aforementioned polymer materials and be efficiently evaporated during the spinning step. In some examples, the solvent of the polymer solution can include but be not limited to alcohol solvents, acetone solvents, acid or ester solvents, other suitable solvents or a combination thereof. For example, the alcohol solvents can be methanol, ethanol, 1-propanol, 2-propanol, hexafluoroisopropanol, triethylene glycol, tetraethylene glycol, benzhydryl alcohol or the like; the acetone solvents can be acetone, methyl ethyl ketone, methyl isobutyl ketone, methyl n-propyl ketone, diisopropyl ketone, diisobutyl ketone or the like; the acid or ester solvents can be formic acid, methyl formate, ethyl formate, propyl methanoate, methyl benzoate, ethyl benzoate, methyl acetate, ethyl acetate, propyl acetate, dimethyl phthalate, diethyl phthalate, dipropyl phthalate or the like; the other suitable solvents can be 1,1-dichloroethane, 1,2-dichloroethane, trichloroethane, dichloropropane, dibromoethane, bromomethane, bromoethane, acetonitrile, tetrahydrofuran, N,N-dimethylformamide, water or the like. Based on the solubility of the polymer material in the solvent, the aforementioned solvents can be used alone or a combination two or more.

Based on the total solid content of the polymer solution as 100 wt %, an amount of the solvent is 60 wt % to 95 wt %, and preferably is 50 wt % to 90 wt %. When the amount of the solvent is within the range, the polymer materials can be efficiently dissolved, and the polymer solution has a suitable amount of solid content, therefore facilitating to produce the nanofibers.

In some examples, the polymer solution used is formed from dissolving polyacrylonitrile ($M_w$ is 100,000 g/mole) in N,N-dimethylformamide, and a concentration of the polymer solution is 10 wt %. The preparation of the polymer solution is well known to one skilled in the art rather than focusing or mentioning them in details.

After the polymer solution is prepared, the spinning step is performed with a closed device. The voltage required for the electrospinning is determined based on the types of the aforementioned polymer materials. In some embodiments, when the polymer materials include polylactic acid, polyvinyl alcohol, polyurethane, polycaprolactone, polyoxyethylene, gelatin or the like, the voltage of the high-voltage electric field applied in the spinning step of the present application is 1000 volts to 30,000 volts to efficiently produce the nanofibers. When the voltage of the high voltage electric field is within the range, the polymer materials can be efficiently spun into the nanofibers, and the spinning step has lower energy costs.

During the spinning step, the polymer solution is injected with a syringe, and supplied to a metal needle for spinning in the closed box through a pipeline. Then, under the aforementioned high-voltage electric field, a micro-injection pump is activated to spin-forming the nanofibers at the metal needle, and the nanofibers can be obtained on the collecting plate below the metal needle.

According to the difference of processing properties of the polymer materials, a flow rate of the nozzle (i.e. a jet flow rate of the polymer solution) of the spinning step can be adjusted. When the polymer materials include polylactic acid, polyvinyl alcohol, polyurethane, polycaprolactone, polyoxyethylene, gelatin or the like, the flow rate of the nozzle can be 0.001 ml/min to 1.0 ml/min, and preferably is 0.001 ml/min to 0.1 ml/min. When the flow rate of the nozzle is in the range, the spinning step has better economic benefits, and the solvent can be efficiently evaporated to form the nanofibers with uniform diameters, therefore preventing from the beading defects.

There are no specific limitations to the time of the spinning step, and it can be adjusted based on the economic benefit and the affections on the fiber-modified layer to the water absorption properties of the superabsorbent polymer. In some examples, the time of the spinning step is 10 minutes to 180 minutes, preferably is 20 minutes to 120 minutes, and more preferably is 30 minutes to 60 minutes. In these examples, the liquid permeability and permeability of the obtained superabsorbent polymer can be efficiently improved, and the superabsorbent polymer has excellent water absorption properties.

The nanofibers formed from the spinning step of the present application have a uniform diameter. In some examples, the diameter of the obtained nanofibers is 10 nm to 1000 nm, and preferably is 50 nm to 1000 nm. When the diameter of the nanofibers is in the range, it is hard for the polymer solution to induce defects of gel blocking in the metal needle, and the permeability of the superabsorbent polymer can be efficiently improved.

When the aforementioned spinning step is performed, the water absorption particles with the shell layer produced by the surface crosslinking reaction are laid on the collecting tray in the closed box, and therefore the nanofibers formed from the spinning step can cover the surface (that is the outer surface of the shell layer) of the water absorption particles, thereby forming the fiber-modified layer on the surface of the water absorption particles to form the superabsorbent polymer of the present application. The nanofibers are anisotropically stacked on the surface of the water absorption particles.

In the obtained superabsorbent polymer, the nanofibers can efficiently improve the liquid permeability and permeability of the superabsorbent polymer without completely cover the outer surface of the shell layer, and the superabsorbent polymer also has excellent water absorption properties. Accordingly, the fiber-modified layer formed from the nanofibers can merely cover a portion of the outer surface of the shell layer, and the fiber-modified layer formed from the nanofibers can be a continuous layer or a discontinuous layer. In other words, in a specific area of the surface of the shell layer, the fiber-modified layer in the specific area can be a continuous layer or a discontinuous layer (i.e. the fiber-modified layer only covers some portions in the specific area, and these portions are not connected to each other).

In other embodiments, the fiber-modified layer formed from the nanofibers completely covers the shell layer. In these embodiments, the superabsorbent polymer has better liquid permeability and permeability and has excellent water absorption properties because the outer surface of the shell layer is completely covered by the fiber-modified layer.

In the spinning process of the present application, the obtained nanofibers can be bonded with the surface of water absorption particles with high water absorption properties which has been subjected to the surface crosslinking treatment, and therefore the superabsorbent polymer has excellent liquid permeability, permeability and water absorption properties. Accordingly, the superabsorbent polymer does not generate the defects of gel blocking and has excellent water absorption properties after the superabsorbent polymer has absorbed a large amount of water. For the present application, the superabsorbent polymer with high liquid permeability and permeability can be produced by utilizing the characteristics of the nanofibers that meet the conditions of the present application, and the superabsorbent polymer is suitable to be as an absorbent applied in various types of sanitary products, agricultural products and food preservation.

The superabsorbent polymer produced by the present application and the hygienic articles produced with the superabsorbent polymer can be preferentially used in diapers, especially fluffless diapers (using a large amount of superabsorbent polymer) and adult diapers. When the conventional superabsorbent polymer is applied in diapers, it cannot have the advantages of improving liquid permeability and permeability without reducing the water absorption properties of the superabsorbent polymer. However, the superabsorbent polymer of the present application can effectively solve this problem.

The purpose of the present application is to provide the simple method to produce the superabsorbent polymer. The superabsorbent polymer produced by the method can improve the liquid permeability and permeability without reducing the water absorption properties of the superabsorbent polymer. The method of the present application at least includes: (a) forming an internal crosslinking structure of the superabsorbent polymer by the free radical polymerization of the aqueous solution of the acid groups-containing monomers; (b) adding the surface crosslinking agent to perform the surface crosslinking treatment to form the shell layer structure of the superabsorbent polymer; (c) preparing the polymer solution for forming the nanofibers; and (d) attaching the nanofibers to the surface of the shell layer of the superabsorbent polymer by the electrospinning process.

Several embodiments are described below to illustrate the application of the present invention. However, these embodiments are not used for limiting the present invention. For those skilled in the art of the present invention, various variations and modifications can be made without departing from the spirit and scope of the present invention.

Producing Water Absorption Particles

Preparation Example 1

Firstly, in a 2000 c.c. conical flask, sodium hydroxide aqueous solution with a concentration of 48% (437.5 g) was slowly added into 540 g of acrylic acid and 583.2 g of water. A dropping ratio of the sodium hydroxide and the acrylic acid was 0.85 to 0.95, a dropping time was 2 hours, and a temperature of the neutralization reaction system in the flask was maintained at 15° C. to 40° C. to obtain a water-soluble unsaturated monomer solution with a monomer concentration of 42 wt %. 70 mole percent of acrylic acid was neutralized to sodium acrylate.

Then, 0.9 g of N,N'-methylenebisacrylamide was added into the water-soluble unsaturated monomer solution, and the temperature was maintained at 20° C. And then, 0.3 g of hydrogen peroxide, 3.6 g of sodium bisulfite and 3.6 g of ammonium persulfate starter were added to perform a reaction.

After the reaction is completed, an obtained hydrogel is chopped with a cutting mill, and small hydrogels with a particle size of 2 mm or less are screened out. Next, the small hydrogels are dried at 130° C. After drying for 2 hours, the dried gel particles were screened by a mesh with a given particle size of 0.1 mm to 0.85 mm to obtain powdery water absorption polymers. The resulted powdery water absorption polymers were evaluated according to the following evaluation method of centrifuge retention capacity, and the centrifuge retention capacity was 41.2 g/g.

200 g of powdery water absorption polymers was added into 5 g of a mixed aqueous solution including ethylene glycol, 1,4-butanediol (manufactured by Formosa Plastics Corporation) and methanol with a ratio of 1/1/0.5, and the solution was further heated at 150° C. for 1 hour. After the solution was cooled, the water absorption particles of Preparation Example 1 were obtained, and the centrifuge retention capacity was 32.7 g/g.

Besides, the water absorption particles of Preparation Example 1 were evaluated according to the following evaluation method. In the water absorption particles of Preparation Example 1, absorption against pressure was 22.5 g/g, residual monomers was 378 ppm, T20 was 380 seconds, U20 was 26.6 g/g, and GBP was 7.0 Darcy.

Preparation Example 2

Firstly, in a 2000 c.c. conical flask, sodium hydroxide aqueous solution with a concentration of 48% (437.5 g) was slowly added into 540 g of acrylic acid and 583.2 g of water. A dropping ratio of the sodium hydroxide and the acrylic acid was 0.85 to 0.95, a dropping time was 2 hours, and a temperature of the neutralization reaction system in the flask was maintained at 15° C. to 40° C. to obtain a water-soluble unsaturated monomer solution with a monomer concentration of 42 wt %. 70 mole percent of acrylic acid was neutralized to sodium acrylate.

Then, 1.3 g of polyethylene glycol diacrylate (molecular weight was 538) was added into the water-soluble unsaturated monomer solution, and the temperature was maintained at 20° C. And then, 0.3 g of hydrogen peroxide, 3.6 g of sodium bisulfite and 3.6 g of ammonium persulfate starter were added to perform a reaction.

After the reaction is completed, an obtained hydrogel is chopped with a cutting mill, and small hydrogels with a particle size of 2 mm or less are screened out. Next, the small hydrogels are dried at 130° C. After drying for 2 hours, the dried gel particles were screened by a mesh with a given particle size of 0.1 mm to 0.85 mm to obtain powdery water absorption polymers. The resulted powdery water absorption polymers were evaluated according to the following evaluation method of centrifuge retention capacity, and the centrifuge retention capacity was 41.6 g/g.

200 g of powdery water absorption polymers was added into 5 g of a mixed aqueous solution including ethylene glycol, 1,4-butanediol and methanol with a ratio of 1/1/0.5, and the solution was further heated at 150° C. for 1 hour. After the solution was cooled, the water absorption particles of Preparation Example 2 were obtained, and the centrifuge retention capacity was 33.7 g/g.

Besides, the water absorption particles of Preparation Example 2 were evaluated according to the following evaluation method. In the water absorption particles of Preparation Example 2, absorption against pressure was 24.9 g/g, residual monomers was 433 ppm, T20 was 300 seconds, U20 was 27.8 g/g, and GBP was 6.9 Darcy.

Preparing Superabsorbent Polymer

Embodiment 1

A polymer solution of Embodiment 1 was firstly prepared. Polyvinyl alcohol ($M_w$ was 94,000 g/mole; a commercial product manufactured by Merck company, and the trademark was 341584) was dissolved in water to form the polymer solution, and a concentration of the polymer solution was adjusted to 10 wt %. Then, 100 g of the water absorption particles of Preparation Example 1 was placed on an electrospinning collection tray, and the polymer solution was injected into a syringe. Next, a high-voltage electric field was controlled to 10,000 volts, and a flow rate of a micro-syringe pump was adjusted to 0.1 ml/min to perform the electrospinning process. After spinning for 15 minutes, the superabsorbent polymer of Embodiment 1 can be obtained on the collecting tray. The water absorption properties of the superabsorbent polymer of Embodiment 1 were evaluated according to the following evaluation method, and the result thereof was listed as Table 1 rather than focusing or mentioning them in details.

Embodiment 2 to Embodiment 10

Embodiment 2 to Embodiment 10 were practiced with the same method as in Embodiment 1, and the difference is that Embodiment 2 to Embodiment 5 adjusted the parameters of the electrospinning, and Embodiment 6 to Embodiment 10 adjusted the compositions of the polymer solution and the parameters of the electrospinning. The polymer solution adopted in Embodiment 6 to Embodiment 10 was to dissolve polyvinyl alcohol ($M_w$ was 94,000 g/mole; a commercial product manufactured by Merck company, and the trademark was 341584) in water, and a concentration of the polymer solution was adjusted to 10 wt %. The parameters and evaluating results thereof were listed as Table 1 rather than focusing or mentioning them in details.

Comparative Embodiment 1

Firstly, in a 2000 c.c. conical flask, sodium hydroxide aqueous solution with a concentration of 48% (437.5 g) was slowly added into 540 g of acrylic acid and 583.2 g of water. A dropping ratio of the sodium hydroxide and the acrylic acid was 0.85 to 0.95, a dropping time was 2 hours, and a temperature of the neutralization reaction system in the flask was maintained at 15° C. to 40° C. to obtain a water-soluble unsaturated monomer solution with a monomer concentration of 42 wt %. 70 mole percent of acrylic acid was neutralized to sodium acrylate.

Then, 0.9 g of N,N'-methylenebisacrylamide was added into the water-soluble unsaturated monomer solution, and the temperature was maintained at 20° C. And then, 100 ppm of phenol was added into the water-soluble unsaturated monomer solution, and 0.3 g of hydrogen peroxide, 3.6 g of sodium bisulfite and 3.6 g of ammonium persulfate starter were added to perform a reaction.

After the reaction is completed, an obtained hydrogel is chopped with a cutting mill, and small hydrogels with a particle size of 2 mm or less are screened out. Next, the small hydrogels are dried at 130° C. After drying for 2 hours, the dried gel particles were screened by a mesh with a given particle size of 0.1 mm to 0.85 mm to obtain powdery water absorption polymers. The centrifuge retention capacity of the resulted powdery water absorption polymers was 41.2 g/g.

200 g of powdery water absorption polymers was added into 5 g of a mixed aqueous solution including ethylene glycol, 1,4-butanediol and methanol with a ratio of 1/1/0.5, and the solution was further heated at 150° C. for 1 hour. After the solution was cooled, the superabsorbent polymer of Comparative Embodiment 1 was obtained, and evaluating results thereof were listed as Table 1 rather than focusing or mentioning them in details.

Comparative Embodiment 2

Comparative Embodiment 2 was practiced with the same method as in Comparative Embodiment 1, and the difference is that 0.2 g of silicon dioxide (a commercial product manufactured by Evonik, and the trademark was A200) was applied to perform a surface treatment to the superabsorbent polymer of Comparative Embodiment 2. The evaluating results of Comparative Embodiment 2 were listed as Table 1 rather than focusing or mentioning them in details.

Evaluation Methods

In the following evaluation methods, unless otherwise specified, the evaluation methods were performed at room temperature (e.g. 21° C. to 25° C.) and in an environment with a relative air humidity of 35% to 55%, and the superabsorbent polymer were uniformly mixed before being evaluated.

1. Fiber Diameter

The fiber diameter was measured with a transmission electron microscope and the well known methods.

2. Centrifuge Retention Capacity

The centrifuge retention capacity (CRC) was evaluated according to the measurement method of ERT 441.3(10) regulated by European Disposables and Nonwovens Association (EDANA).

3. Absorption Against Pressure

The absorption against pressure (AAP) was evaluated according to the measurement method of ERT 442.3(10) regulated by EDANA. Under a pressure of 4.9 kPa, AAP was evaluated with a sodium chloride aqueous solution with a concentration of 0.9 wt % for 60 minutes. The AAP preferably was 15 g/g or more, and more preferably was 20 g/g to 30 g/g.

4. Residual Monomers

The residual monomers (RAA) were evaluated according to the measurement method of ERT 410.3(10) regulated by EDANA.

5. T20 and U20

The T20 and U20 value were measured with dynamic effective permeability and absorption kinetics testing method (K(t) testing method).

The testing method determined a time-dependent effective permeability (K(t)) based on absorption kinetics against pressure of a hydrogel layer formed from superabsorbent polymer particles or a structure comprising the absorbent particles. The purpose of the testing method was to evaluate an ability of distributing liquids for the hydrogel formed from the superabsorbent polymer particles or absorbent products comprising the absorbent particles when the polymers are present in the absorbent products with a high concentration and being subjected to mechanical pressure. Darcy's law and the steady state flow method were used to calculate the performance of the effective permeability, and details thereof were well known to one skilled in the art. For example, this determination method can be referred to P. K. Chatterjee (1982), Absorbency, Elsevier, 42-43, and J. M. Coulson & J. F. Richardson (1978), Chemical Engineering, vol. II, 3rd edn., Pergamon Press, 122-127.

The equipment used in the aforementioned method was known as a time-dependent permeability tester, and it can be a product manufactured by BRAUN GmbH, and the equipment number is 03-080578.

T20 was measured and calculated with calculation formulas used in the aforementioned K(t) testing method. The testing method measured a required time (seconds) that the testing sample absorbed from 0 second to an absorbent amount of 20 g/g, and the testing method was performed based on the disclosures recited in CN 103619291A.

U20 was measured and calculated with calculation formulas used in the aforementioned K(t) testing method. An absorbent amount (g/g) that the testing sample absorbed for 20 minutes was analyzed, and the testing method was performed based on the disclosures recited in CN 103619291A.

6. Free Swelling Gel Bed Permeability

The free swell gel bed permeability (FSGBP) referred to a permeability amount (Darcy) of liquid in the gel bed permeability testing equipment with superabsorbent polymer particles under a condition of free swelling. The free swelling means that the superabsorbent polymer was allowed to swell without a swelling restraint loading, and it can also be known as the gel bed permeability (GBP) at a swelling pressure of 0 psi. The testing method was performed based on the disclosures recited in U.S. Pat. No. 8,822,582B2.

scale bar represented 300 μm. Compared with FIG. 2E (i.e. the superabsorbent polymer of Comparative Embodiment 1), the surface of the superabsorbent polymer in FIG. 2A to FIG. 2D had the fiber-modified layer formed from the stacked nanofibers, and a portion of the shell layer of the superabsorbent polymer was not covered by the fiber-modified layer. Furthermore, the liquid permeability and permeability of the superabsorbent polymer were both improved based on the evaluation results in Table 1, and therefore the superabsorbent polymer would have well liquid permeability and permeability and excellent water absorption properties when at least one portion of the shell layer was covered with the fiber-modified layer.

TABLE 1

| | | | Embodiment | | | | | | | | | | Comparative Embodiment | |
|---|---|---|---|---|---|---|---|---|---|---|---|---|---|---|
| | | | 1 | 2 | 3 | 4 | 5 | 6 | 7 | 8 | 9 | 10 | 1 | 2 |
| electro-spinning | super-absorbent polymer (g) | Preparation Example 1 | 100 | 100 | 100 | 100 | 100 | 0 | 0 | 0 | 0 | 0 | (not subjected) | |
| | | Preparation Example 2 | 0 | 0 | 0 | 0 | 0 | 100 | 100 | 100 | 100 | 100 | | |
| | high-voltage electric field (kV) | | 10 | 20 | 20 | 20 | 30 | 10 | 20 | 20 | 20 | 30 | | |
| | flow rate of micro-syringe pump (ml/min) | | 0.1 | 0.1 | 0.05 | 0.01 | 0.05 | 0.1 | 0.1 | 0.05 | 0.01 | 0.05 | | |
| | spinning time (min) | | 15 | 15 | 30 | 150 | 30 | 15 | 15 | 30 | 150 | 30 | | |
| Evaluation Results | Fiber Diameter (nm) | | 1288 | 1044 | 711 | 820 | 732 | 1352 | 1189 | 689 | 796 | 715 | — | — |
| | Centrifuge Retention Capacity (g/g) | | 32.1 | 32.2 | 32.3 | 32.1 | 32.3 | 32.8 | 33.1 | 33.2 | 33.3 | 33 | 31.7 | 31.5 |
| | Absorption Against Pressure (g/g) | | 21.9 | 21.6 | 21.2 | 21.3 | 21.1 | 24.2 | 23.7 | 23.5 | 23.7 | 23.3 | 21.8 | 16.2 |
| | Residual Monomers (ppm) | | 388 | 40 | 397 | 389 | 392 | 422 | 441 | 412 | 409 | 396 | 669 | 386 |
| | T20 (s) | | 359 | 34 | 318 | 327 | 331 | 273 | 268 | 229 | 236 | 244 | 368 | 352 |
| | U20 (g/g) | | 26.7 | 26.4 | 27.3 | 26.8 | 26.9 | 27.5 | 27.7 | 28.9 | 28.3 | 28.5 | 25.8 | 25.1 |
| | GBP (Darcy) | | 7.7 | 7.8 | 15.3 | 11.4 | 12.1 | 7.8 | 8.1 | 19.8 | 13.2 | 12.7 | 7.1 | 7.9 |

Based on Table 1, the evaluation results of T20, U20 and GBP of the superabsorbent polymers of Embodiment 1 to Embodiment 10 produced by the electrospinning process all were improved comparing with those of Preparation Example 1 and Preparation Example 2, and therefore the superabsorbent polymers of Embodiment 1 to Embodiment 10 have better liquid permeability and permeability. In Comparative Embodiment 1, phenol was further added to perform the surface crosslinking reaction. Although the adding of phenol facilitated to enhance the liquid permeability of the superabsorbent polymer, the water absorption properties thereof were lowered. Besides, the superabsorbent polymer of Comparative Embodiment 1 did not have well permeability. In Comparative Embodiment 2, $SiO_2$ powders were used to perform the surface treatment to the superabsorbent polymer. Although the adding of the $SiO_2$ powders facilitated to enhance the liquid permeability, the absorption against pressure (AAP) was significantly lowered and permeability was poor. Accordingly, the present application applied the electrospinning to form the fiber-modified layer to perform the surface treatment to the superabsorbent polymer, and therefore the superabsorbent polymer not only had well liquid permeability and permeability but also excellent absorption properties.

Figure 2A:
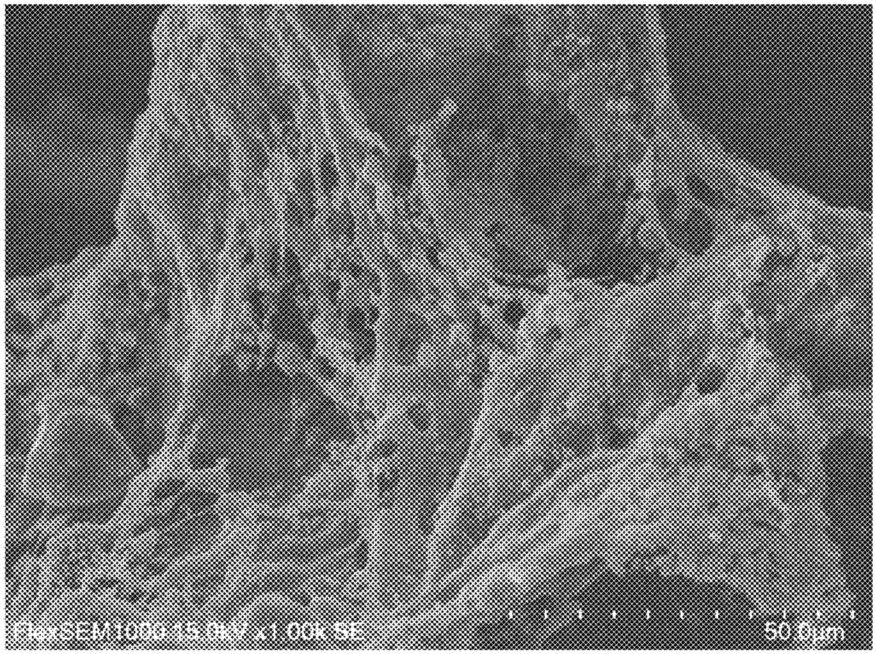
FIG. 2A to FIG. 2E respectively shows a scanning electron micrograph image of superabsorbent polymers of Embodiment 1, Embodiment 3, Embodiment 5, Embodiment 8 and Comparative Embodiment 1 of the present application.
Figure 2B:
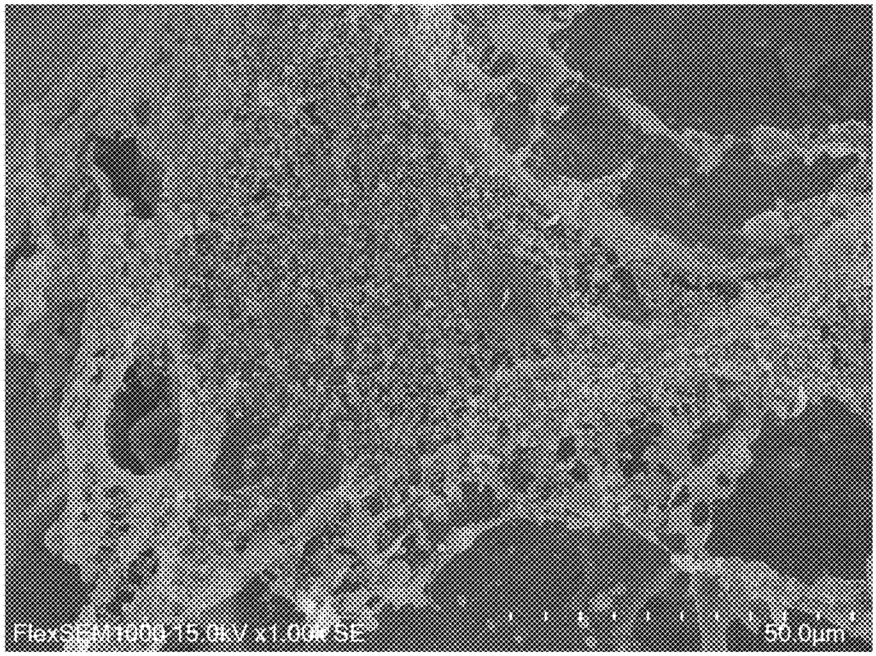
Figure 2C:
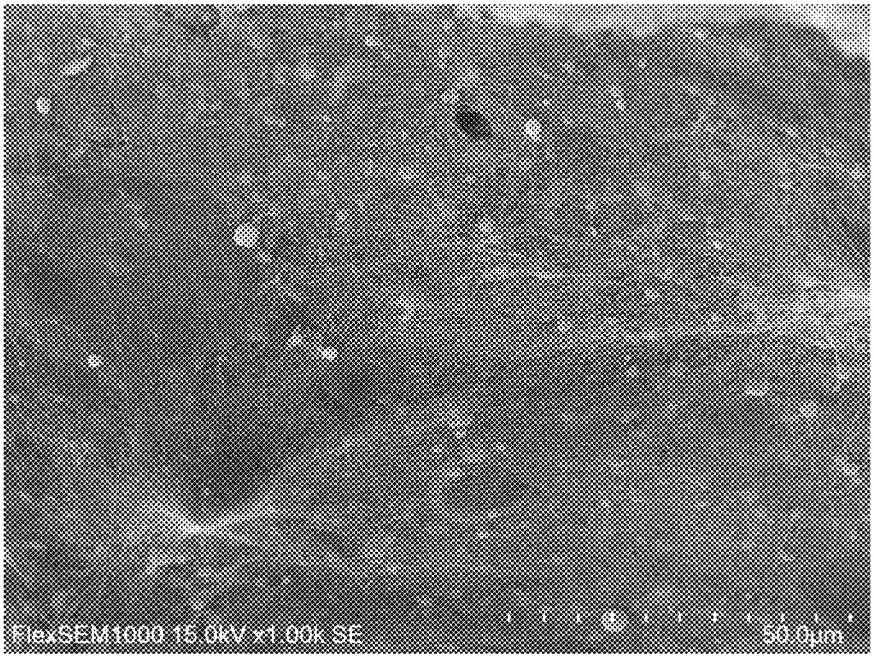
Figure 2D:
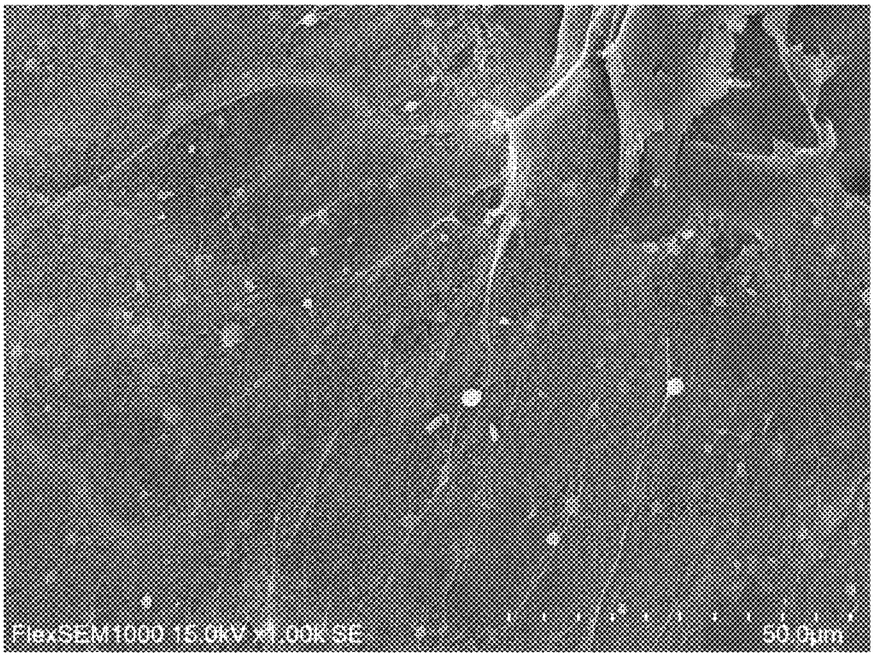
Figure 2E:
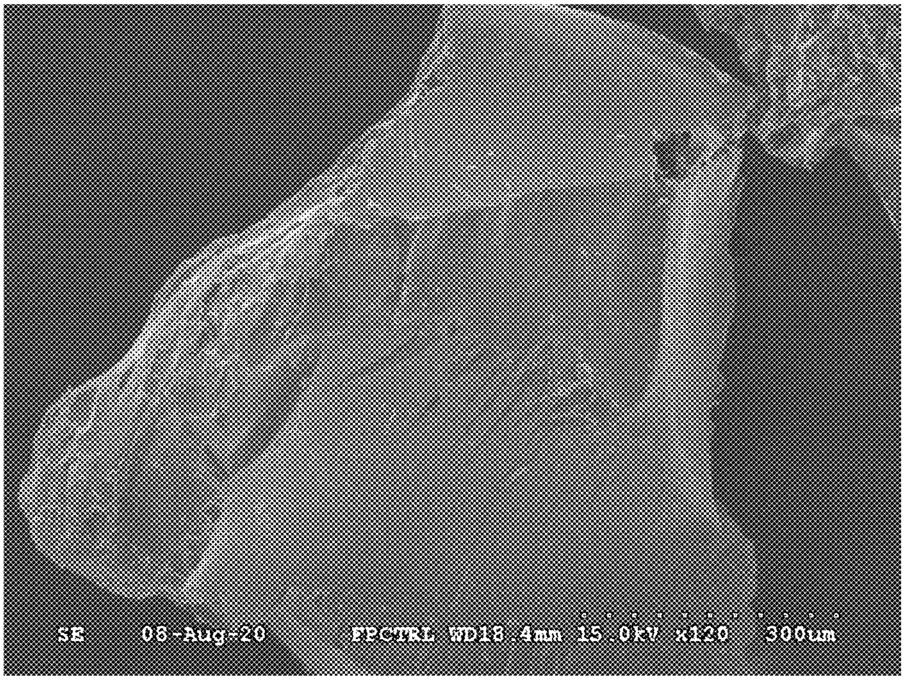

Referring to FIG. 2A to FIG. 2E. Those figures respectively showed a scanning electron micrograph of the superabsorbent polymer of Embodiment 1, Embodiment 3, Embodiment 5, Embodiment 8 and Comparative Embodiment 1 of the present application. The magnification in FIG. 2A to FIG. 2D is 1000 times, and the scale bar represented 50.0 μm. The magnification in FIG. 2E is 120 times, and the Based on the aforementioned Embodiments, in the superabsorbent polymer with excellent liquid permeability and permeability and the method for producing the same of the present application, the advantage is to perform the surface treatment process to the superabsorbent polymer with the electrospinning technology, such that the superabsorbent polymer simultaneously is equipped with excellent liquid permeability and permeability based on the properties of high porosity and high specific surface area of the nanofibers. Accordingly, the superabsorbent polymer of the present application can be applied in various personal hygiene products, such as ultra-thin baby diapers or adult diapers.

As is understood by a person skilled in the art, the foregoing preferred embodiments of the present application are illustrated of the present application rather than limiting of the present application. In view of the foregoing, it is intended to cover various modifications and similar arrangements included within the spirit and scope of the appended claims. Therefore, the scope of which should be accorded the broadest interpretation so as to encompass all such modifications and similar structure.

What is claimed is:

1. A method for producing a superabsorbent polymer, comprising:

performing a free radical polymerization reaction to a superabsorbent polymer composition to form a cross-linked core structure, wherein the superabsorbent polymer composition comprises:

an aqueous solution of acid groups-containing monomers;

a crosslinking agent; and a polymerization initiator, including a thermal decomposition initiator and/or a redox initiator;

performing a surface crosslinking reaction to the crosslinked core structure to form a shell layer on the crosslinked core structure, wherein the shell layer completely covers the crosslinked core structure; and performing a spinning process after performing the surface crosslinking reaction to form a fiber-modified layer on an outer surface of the shell layer to obtain the superabsorbent polymer, wherein the fiber-modified layer covers at least one portion of the outer surface, and the fiber-modified layer includes a plurality of fibers.

2. The method for producing the superabsorbent polymer of claim 1, wherein the aqueous solution of acid groups-containing monomers has a neutralization concentration of 45 molar percent to 85 molar percent.

3. The method for producing the superabsorbent polymer of claim 1, wherein the crosslinked core structure is cut to form a hydrogel with a particle size of 0.05 mm to 2.00 mm before performing the surface crosslinking reaction.

4. The method for producing the superabsorbent polymer of claim 1, wherein the spinning process includes:

preparing a polymer solution, wherein the polymer solution includes a polymer material; and performing a spinning step to the polymer solution to form the fibers.

5. The method for producing the superabsorbent polymer of claim 4, wherein the spinning step is performed in a closed environment.

6. The method for producing the superabsorbent polymer of claim 4, wherein a molecular weight of the polymer material is 10,000 g/mole to 500,000 g/mole.

7. The method for producing the superabsorbent polymer of claim 4, wherein a hydrophilic-lipophilic balance (HLB) value of the polymer material is 11 to 19.

8. The method for producing the superabsorbent polymer of claim 4, wherein the spinning step is performed by electrospinning.

9. The method for producing the superabsorbent polymer of claim 8, wherein the spinning step includes applying a high-voltage electric field to the polymer solution.

10. The method for producing the superabsorbent polymer of claim 9, wherein the high-voltage electric field is 1000 volts to 30,000 volts.

11. The method for producing the superabsorbent polymer of claim 8, wherein a diameter of the fibers is not more than 1000 nm.

12. A method for producing a superabsorbent polymer, comprising:

performing a free radical polymerization reaction to a superabsorbent polymer composition to form a crosslinked core structure, wherein the superabsorbent polymer composition comprises:

an aqueous solution of acid groups-containing monomers with a neutralization concentration of 45 molar percent to 85 molar percent;

a crosslinking agent; and a polymerization initiator, including a thermal decomposition initiator and/or a redox initiator;

performing a surface crosslinking reaction to the crosslinked core structure to form a shell layer on the crosslinked core structure, wherein the shell layer completely covers the crosslinked core structure; and after performing the surface crosslinking reaction, performing an electrospinning process with a polymer solution to form a fiber-modified layer on an outer surface of the shell layer to obtain the superabsorbent polymer, wherein the electrospinning process is performed in a closed environment, the fiber-modified layer covers at least one portion of the outer surface, and the fiber-modified layer includes a plurality of fibers.

13. The method for producing the superabsorbent polymer of claim 12, wherein the fiber-modified layer completely covers on the outer surface of the shell layer.

14. The method for producing the superabsorbent polymer of claim 12, wherein the fiber-modified layer discontinuously covers on a plurality of portions of the outer surface of the shell layer.

* * * * *